United States Patent
Nory et al.

(10) Patent No.: US 9,252,918 B2
(45) Date of Patent: Feb. 2, 2016

(54) METHOD AND APPARATUS FOR CONTROL CHANNEL TRANSMISSION AND RECEPTION

(75) Inventors: Ravikiran Nory, Buffalo Grove, IL (US); Sandeep H. Krishnamurthy, Mountain View, CA (US); Robert T. Love, Barrington, IL (US); Vijay Nangia, Algonquin, IL (US); Ajit Nimbalker, Buffalo Grove, IL (US); Krishna Kamal Sayana, Garland, TX (US); Xiangyang Zhuang, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 696 days.

(21) Appl. No.: 13/569,646

(22) Filed: Aug. 8, 2012

(65) Prior Publication Data

US 2013/0044664 A1 Feb. 21, 2013

Related U.S. Application Data

(60) Provisional application No. 61/523,568, filed on Aug. 15, 2011.

(51) Int. Cl.
 *H04L 1/00* (2006.01)
(52) U.S. Cl.
 CPC .................... *H04L 1/0045* (2013.01)
(58) Field of Classification Search
 USPC ........................................................ 370/311
 See application file for complete search history.

(56) References Cited

U.S. PATENT DOCUMENTS

| 2010/0331030 A1 | 12/2010 | Nory et al. |
| 2011/0019776 A1 | 1/2011 | Zhang et al. |

(Continued)

FOREIGN PATENT DOCUMENTS

| WO | 2008157692 A2 | 12/2008 |
| WO | 2010013961 A2 | 2/2010 |

(Continued)

OTHER PUBLICATIONS

Motorola: "Search Space Definition for L1/L2 Control Channels". 3GPP Draft; R1-073373—PDCCH Candidate Search Space. 3rd Generation Partnership Project (3GPP). Mobile Competence Centre, 650. Route Des Lucioles •, F-06921 Sophia-Antipolis Cedex •, France.

(Continued)

*Primary Examiner* — Robert M Morlan
(74) *Attorney, Agent, or Firm* — Lerner, David, Littenberg, Krumholz & Mentlik, LLP

(57) ABSTRACT

A communication system is provided wherein a user equipment (UE) receives control information from a wireless network. The UE monitors control channel candidates using common reference signals (CRS) and monitors enhanced control channel candidates using demodulation reference signals (DMRS) when the UE is configured in a first transmission mode, such as transmission mode 9, for receiving a downlink shared traffic channel based on DMRS. The UE monitors control channel candidates only using CRS when the UE is configured in a second transmission mode, such as any of transmission modes 1-6, for receiving a downlink shared traffic channel based on CRS. The UE then receives downlink control information (DCI) in a subframe in one of the monitored control channel candidates or enhanced control channel candidates in the subframe.

16 Claims, 9 Drawing Sheets

(56) References Cited

U.S. PATENT DOCUMENTS

| | | | |
|---|---|---|---|
| 2011/0038275 A1 | 2/2011 | Kim et al. | |
| 2011/0064159 A1 | 3/2011 | Ko et al. | |
| 2011/0083066 A1* | 4/2011 | Chung et al. | 714/807 |
| 2011/0243059 A1* | 10/2011 | Liu et al. | 370/315 |
| 2011/0249633 A1* | 10/2011 | Hong et al. | 370/329 |
| 2011/0274031 A1 | 11/2011 | Gaal et al. | |
| 2012/0028628 A1* | 2/2012 | Frenger et al. | 455/422.1 |
| 2012/0033643 A1 | 2/2012 | Noh et al. | |
| 2012/0063351 A1* | 3/2012 | Kim et al. | 370/252 |
| 2012/0275530 A1* | 11/2012 | Nazar et al. | 375/267 |
| 2012/0320782 A1* | 12/2012 | Seo et al. | 370/252 |
| 2013/0010682 A1* | 1/2013 | Kim et al. | 370/315 |
| 2013/0051351 A1* | 2/2013 | Seo et al. | 370/329 |
| 2013/0100921 A1* | 4/2013 | Nakao et al. | 370/329 |
| 2013/0114539 A1* | 5/2013 | Kim et al. | 370/329 |
| 2013/0114563 A1* | 5/2013 | Oizumi et al. | 370/329 |

FOREIGN PATENT DOCUMENTS

| | | | |
|---|---|---|---|
| WO | WO 2011129610 A2 * | 10/2011 | |
| WO | WO 2011142576 A2 * | 11/2011 | |
| WO | WO 2011145864 A2 * | 11/2011 | |
| WO | WO2012011240 A2 * | 1/2012 | |
| WO | WO 2012011241 A1 * | 1/2012 | H04W 72/04 |

OTHER PUBLICATIONS

Qualcomm Incorporated: "Remaining details of R-PDCCH search space", 3GPP Draft; R1-106377 Remaining Details of R-PDCCH Search Space, 3rd Generation Partnership Project (3GPP), Mobile Competence Centre ; 650, Route Des Lucioles ; F-06921 Sophia-Antipolis C.

LG Electron ICS: "Resource Allocation and Downlink Control Channel Structure for Relay Backhaul Link", 3GPP Draft; R1-094189 RPDCCH LGE, 3rd Generation Partnership Project (3GPP), Mobile Competence Centre; 650, Route Des Loucioles ; F-06921 Sophia-Antipoli.

Patent Cooperation Treaty, "PCT Search Report and Written Opinion of the International Searching Authority" for International Application No. PCT/US2012/050694 dated Nov. 16, 2012, 14 pages.

Nokia et al: "On enhanced downlinkcontrol signalling for Re1-11", 3GPP Draft; RI-111743, 3rd Generation Partnership Project (3GPP), Mobile Competence Centre., 650, Route Des Lucioles., F-06921 Sophia-Antipolis Cedex, France, vol. RAN WG1, no. Barcelona, Spain; May 9, 2011, May 3, 2011.

Huawei et al: IIR-PDCCH Search Space Size, 3GPP Draft; RI-105850, 3rd Generation Partnership Project (3GPP), Mobile Competence Centre ; 650, Route Des Lucioles ; F-06921 Sophia-Antipolis Cedex; France, vol. RAN WG1, no. Jacksonville, USA; Nov. 15, 2010, Nov. 9, 2010.

LG Electronics: "Fallback Operation for a UE configured with ePDCCH", 3GPP Draft; RI-122311 Fallback Operation in EPDCCH LG, 3rd Generation Partnership Project (3GPP), Mobile Competence Centre; 650, Route Des Lucioles ; F-06921 Sophia-Antipolis Cedex ; France, vol. RAN WG1, no. Prague, Czech Republic; 20128521—May 12, 2012.

Panasonic: "Considerations on PDCCH Enhancements for Release 11", 3GPP Draft; RI-111589 PDCCH Enhancement, 3rd Generation Partnership Project (3GPP), Mobile Competence Centre; 658, Route Des Lucioles ; F-06921 Sophia-Antipolis Cedex; France, vol. RAN WG1, no. Barcelona, Spain; May 9, 2011, May 3, 2011.

Qualcomm Incorporated: "R-PDCCH search space", 3GPP Draft; RI-184814 R-PDCCH Search Space, 3rd Generation Partnership Project (3GPP), Mobile Competence Centre; 650, Route Des Lucioles ; F-06921 Sophia-Antipolis Cedex ; France, vol. RAN WG1, no. Madrid, Spain; Aug. 23, 2010,Aug. 17, 2010.

Motorola: "Temporary C-RNTI, C-RNTI use with Common and UE Specific Search Spaces", 3GPP Draft; RI-084583(RI-084419)—Draft CR 36 213 TC-RNTI, C-RNTI Use With CCSS and UESS, 3rd Generation Partnership Project (3GPP), Mobile Competence Centre; 650, Route Des Lucioles ; F-06921 Sophia-Antipolis Cedex ; France, vol. RAN WG1, no. Prague, Czech Republic; Nov. 15, 2000, Nov. 7, 2000.

China UNICOM: "Consideration on Multiplexing of Localized and Distributed ePDCCH", 3GPP Draft; RI-122388 Consideration on Multiplexing of Localised and Distributed EPDCCH, 3rd Generation Partnership Project (3GPP), Mobile Competence Centre; 650, Route Des Lucioles ; F-06921 Sophia-Antipolis Cedex ; France, vol. RAN WG1, no. Prague, Czech Republic; May 21, 2012-May 25, 2012, May 12, 2012.

Patent Cooperation Treaty, International Search Report and Written Opinion of the International Searching Authority for International Application No. PCT/US2012/050700, Mar. 11, 2013, 22 pages.

European Examination Report for Application No. 12751668.0 dated Dec. 22, 2014.

Japanese Office Action for Application No. 2014-524165 dated Dec. 2, 2014.

Samsung, "Discussion on Downlink Control Channel Enhancement", R1-111471, [online], May 2011, 3GPP TSG-RAN1 #65 Meeting, Searched on Nov. 18, 2014 over Internet, <http://www.3gpp.org/ftp/tsg_ran/wg1_r11/TSGR1_65/Docs/R1_111471.zip>.

Nokia et al, "On enhanced downlink control signalling for Rel-11.", 3GPP Draft; R1-111743, May 3, 2011 3rd Generation Partnership Project (3GPP), Mobile Competence Centre; 650, route des Lucioles ; F-06921 Sophia-Antipolis Cedex ; France. vol. RAN WG1, Nr: Barcelona, Spain; May 9, 2011. XP050491341.

Huawei et al: "R-PDCCH Search Space Size", 3GPP Draft; R1-105850, 3rd Generation Partnership Project (3GPP), Mobile Competence Centre ; 650, Route Des Lucioles ; F-06921 Sophia-Antipolis Cedex; France, vol. RAN WG1, no. Jacksonville, USA; Nov. 15, 2010, Nov. 9, 2010, all pages.

LG Electron ICS: "Fallback Operation for a UE configured with ePDCCH", 3GPPDRAFT; RI-122311 Fallback Operation in EPDCCH LG, 3rd Generation Partnership Project (3GPP), Mobile Competence Centre; 650, Route Des Lucioles ; F-06921 Sophia-Antipolis Cedex ; France, vol. RAN WG1, no. Prague, Czech Republic; May 21, 2012-May 25, 2012, May 12, 2012, all pages.

Panasonic: "Considerations on PDCCH Enhancements for Release 11", 3GPP Draft; RI-111589 PDCCH Enhancement, 3rd Generation Partnership Project (3GPP), Mobile Competence Centre; 650, Route Des Lucioles ; F-06921 Sophia-Antipolis Cedex; France, vol. RAN WG1, no. Barcelona, Spain; May 9, 2011, May 3, 2011, all pages.

LG Electronics: "Discussions on DL Control Signaling Enhancement", 3GPP TSG RAN WG1 Meeting #65, Barcelona, Spain, May 9-13, 2011, R1-111789, all pages.

NTT DoCoMo: "DL Control Channel Enhancement for DL MIMO in Rel-11", 3GPP TSG RAN WG1 Meeting #65, Barcelona, Spain, May 9-13, 2011, R1-111636, all pages.

3rd Generation Partnership Project; Technical Specification Group Radio Access Network; Evolve Universal Terrestrial Radio Access (E-UTRA); Physical layer for relaying operation (Release 10), 3GPP TS 36.216 v10.2.0 (Mar. 2011), all pages.

Huawei, Hisilicon: "Inventigation on downlink control channel and signaling enhancements", 3GPP TSG RAN WG1 Meeting #65, Barcelona, Spain, May 9-13, 2011, R1-111253, all pages.

Nokia, Nokia Siemens Networks: "On enhanced downlink control signalling for Rel-11", 3GPP TSG RAN WG1 Meeting #65, Barcelona, Spain, May 9-13, 2011, R1-111743, all pages.

* cited by examiner

|  | Normal subframe | | MBSFN subframe | |
|---|---|---|---|---|
|  | 2 CRS ports | 4 CRS ports | 2 CRS ports | 4 CRS ports |
| PCFICH=3 | 24-32 | 24-32 | N/A | N/A |
| PCFICH=2 | 36-44 | 36-44 | 40-48 | 40-48 |
| PCFICH=1 | 48-56 | 44-52 | 52-60 | N/A |
| PCFICH=0 | 56-64 | 52-60 | 60-68 | 56-64 |
| 2nd slot | 32-64 | 28-60 | 40-72 | 40-72 |

NUMBER OF AVAILABLE REs PER RB FOR EPDCCH

METHOD AND APPARATUS FOR CONTROL CHANNEL TRANSMISSION AND RECEPTION

RELATED APPLICATIONS

This application claims priority to U.S. Patent Application No. 61/523,568 filed Aug. 15, 2011.

CROSS REFERENCE TO RELATED APPLICATIONS

This application is related to U.S. patent application Ser. No. 13/569,606, entitled "METHOD AND APPARATUS FOR CONTROL CHANNEL TRANSMISSION AND RECEPTION," and filed on the same date as this application.

FIELD OF THE INVENTION

The present disclosure relates generally to wireless communication systems, and more particularly to control channel transmission and reception in an Orthogonal Frequency Division Multiplexing (OFDM) communication system.

BACKGROUND OF THE INVENTION

In current 3GPP LTE (Third Generation Partnership Project Long Term Evolution) communication systems, that is, Releases 8, 9, and 10, downlink (DL) control signaling from an eNodeB is received by user equipment (UE) in the first, first two, or first three, or first four symbols of a subframe subsequently referred to as control symbols. The remaining symbols in the subframe, following the control symbols, are typically used for receiving user data. For example, FIG. 1 depicts an exemplary subframe structure of the prior art with three control symbols. Control signaling is spread across an entire carrier bandwidth (for example, 10 Megahertz (MHz)) of the first three symbols of the subframe and is received by the UE on a Physical Downlink Control Channel (PDCCH). User data is received by the UE on the Physical Downlink Shared Channel (PDSCH), and in select Resource Blocks (RBs) of the PDSCH occupying either in the entire carrier bandwidth or a portion of it.

In order to decode the information sent on PDCCH, the UE needs to perform channel estimation for coherent demodulation of the PDCCH. To perform channel estimation, the UE receives Reference Signals (RSs), for example, pilot symbols, that are Cell-specific reference signals (CRS) and included in the subframe and that are associated with one or more antenna ports. For example, in 3GPP LTE Releases 8, 9, and 10, the UE uses the CRSs associated with one or more of antenna ports 0, 1, 2, and 3 for receiving the PDCCH. The CRS structure for antenna ports 0, 1, 2, and 3 is shown in FIG. 1, wherein RSs labeled R0 are resource elements carrying RSs associated with antenna port 0, RSs labeled R1 are resource elements carrying RSs associated with antenna port 1, RSs labeled R2 are resource elements carrying RSs associated with antenna port 2, and RSs labeled R3 are resource elements carrying RSs associated with antenna port 3. An antenna port is defined such that a channel over which a symbol on the antenna port is conveyed can be inferred from the channel over which another symbol on the same antenna port is conveyed. Other signals and channels such as synchronization signals such as Primary/Secondary Synchronization channels (P/S-SCH), broadcast control channels, including primary broadcast control channel (PBCH), etc may also be present in a subframe. Typically, a master information block (MIB) is sent on the Physical Broadcast CHannel (PBCH), the MIB comprises of a portion of a system frame number (SFN), downlink system bandwidth and Physical Hybrid ARQ Channel (PHICH) configuration (such as duration and PHICH resource indicator). In LTE Release-8, the PBCH is sent on subframe 0 (each subframe comprising of two slots, each slot corresponding to a 0.5 milli-second) of a radio frame. The Synchronization signals are transmitted within the inner six PRBs or inner 72 subcarriers (approximately 1.1 MHz) of the carrier bandwidth on subframes 0 and 5 of radio frame. The exact location of the Synchronization signals changes based on the duplex type and Cyclic Prefix length.

For 3GPP LTE Release 10, in order to demodulate user data (sent on PDSCH), the UE can either use the RSs associated with antenna ports 0, 1, 2, and 3 or it can use RSs associated with other antenna ports, such as antenna ports 7, 8, 9, 10, 11, 12, 13, and 14, that is, the UE can use RSs associated with all or a subset of these antenna ports, based on the transmission scheme used for PDSCH reception (in turn, the transmission scheme depends on configuration signaling from a serving eNodeB). The RSs associated with antenna ports antenna ports 7, 8, 9, 10, 11, 12, 13, and 14 are typically referred to as "UE specific reference signals (UERSs)" or "Demodulation reference signals (DMRSs)" or "Dedicated reference signals (DRS)." The RSs associated with antenna ports 0, 1, 2, and 3 are typically referred to as "Common Reference Symbols (CRSs)." In transmission schemes based on CRS, the UE may use one or more of antenna ports 0, 1, 2, 3 and for transmission schemes based on DMRS, the UE may use antenna ports one or more of 7, 8, 9, 10, 11, 12, 13, 14. The actual number of spatial transmission layers and the associated antenna ports when using DMRS to decode PDSCH may be determined by the UE based on the downlink control channel (DCI) information associated with PDSCH. Typically, both CRS and DMRS are not simultaneously used to demodulate data in PDSCH. While the CRSs are sent across the entire carrier bandwidth by the eNodB, DMRSs can only be present in those RBs for which the UE has a PDSCH assignment. Therefore, when receiving PDSCH using DMRS, the UE can only use the DMRS present on those RBs for which it has a PDSCH assignment.

For 3GPP LTE Release 11 (the next generation LTE system), it is envisioned that new DL control signaling will be sent by the eNodeB to the UE in symbols that span a first time slot of the subframe or in symbols that span both the first and second time slots of the subframe. The new DL control signaling is generally referred to as Enhanced-PDCCH (EPDCCH). Unlike the PDCCH, which is transmitted across the entire channel bandwidth, a UE is expected to receive the EPDCCH in a set of RBs that may span only a portion of the carrier bandwidth in frequency domain. Also, unlike the PDCCH, which is received by the UE using CRS, it is envisioned that the EPDCCH can be received by the UE using DMRS The new DL control signaling, that is, the EPDCCH, is expected to be used to complement the downlink control channels, that is, the PDCCH, of the existing 3GPP LTE Releases 8/9/10 for supporting features of Long Term Evolution-Advanced (LTE-A) Release 11+, such as CoMP (Co-ordinated Multi-point Transmissions) and enhanced Multiple-Input Multiple-Output (MIMO) techniques, including Multi-User MIMO (MU-MIMO). EPDCCH can allow advanced control channel transmission schemes such as beamformed frequency-selective control transmission, dedicated control transmission to a user via use of DMRS, spatially multiplexed control channel transmission to a single user MIMO (SU-MIMO) and MU-MIMO control transmission.

To receive EPDCCH, the UE has to perform blind decoding for several EPDCCH candidates, that is, EPDCCH signals that are possibly intended for the UE. In 3GPP LTE Release 10, in order to receive the PDCCH, the UE performs a maximum of 44 (60 if configured for uplink (UL) MIMO) blind decodes for the primary cell in each non-DRX (discontinuous reception) subframe. If the UE is configured for carrier aggregation (CA), the UE performs 32 additional blind decodes for each configured and activated secondary cell. In order to also receive the EPDCCH, the number of blind decodes that the UE has to perform increases significantly, imposing a significant time and processing load burden in the UE Therefore, a need exists for mechanisms that ensure that the blind decoding complexity at the UE to receive both a PDCCH and an EPDCCH is kept at a reasonable level.

BRIEF DESCRIPTION OF THE DRAWINGS

FIG. 7 are block diagrams of exemplary subframe structures illustrating two approaches for a signaling of an Enhanced Physical Downlink Control Channel (EPDCCH) to the user equipment of FIG. 3 in accordance with various embodiments of the present invention.

FIG. 9 is a table depicting a number of available resource elements per resource block for the EPDCCH in accordance with various embodiments of the present invention.

Figure 1:
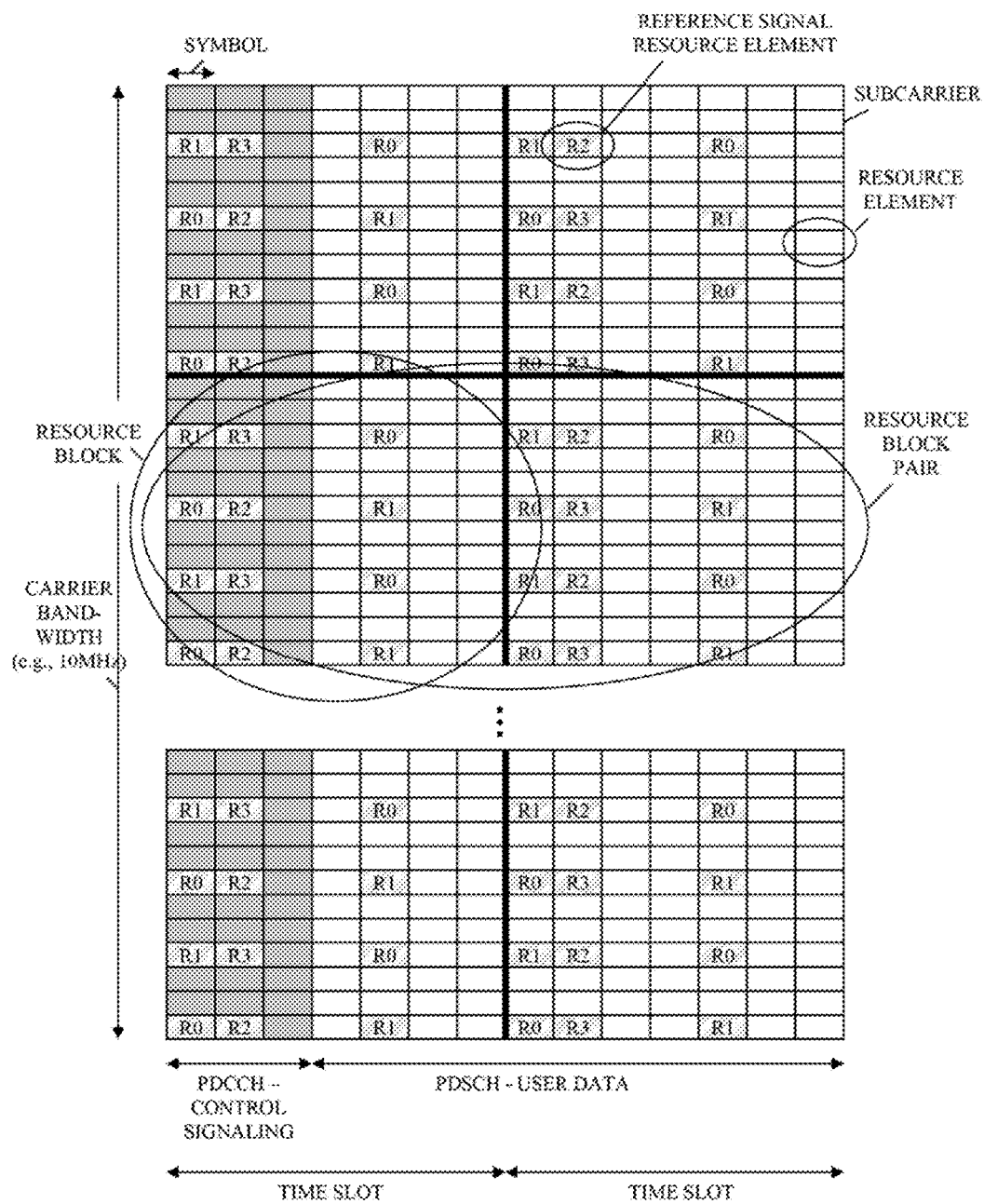
FIG. 1 is a time-frequency diagram of an exemplary subframe structure of the prior art.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

In order to address the need for mechanisms that ensure that the blind decoding complexity at a user equipment (UE) to receive both a Physical Downlink Control Channel (PDCCH) and an Enhanced PDCCH (EPDCCH) is kept at a reasonable level, a communication system is provided wherein a UE receives control information from a wireless network. The UE monitors control channel candidates using common reference signals (CRS) and monitors enhanced control channel candidates using demodulation reference signals (DMRS) when the UE is configured in a first transmission mode, such as transmission mode 9, for receiving a downlink shared traffic channel based on DMRS. The UE monitors control channel candidates only using CRS when the UE is configured in a second transmission mode, such as any of transmission modes 1-6, for receiving a downlink shared traffic channel based on CRS. The UE then receives downlink control information (DCI) in a subframe in one of the monitored control channel candidates or enhanced control channel candidates in the subframe.

In other embodiments of the present invention, the UE may determine if enhanced control channel candidates using demodulation reference signals (DMRS) are monitored in a subframe, monitor, in the subframe, a set control channel candidates using common reference signals (CRS), and receive, in the subframe, downlink control information (DCI) in a control channel candidate within the set of control channel candidates, wherein the set control channel candidates is based on whether enhanced control channel candidates using demodulation reference signals (DMRS) are monitored in the subframe. In still other embodiments of the present invention, the UE monitors enhanced control channel candidates at a first set of aggregation levels in a first subframe, monitors enhanced control channel candidates at a second set of aggregation levels in a second subframe, wherein the second set of aggregation levels is different from the first set of aggregation levels, determines the first set of aggregation levels and second set of aggregation levels based on one or more of a subframe type of the subframes, a channel state information (CSI) reference signal configuration in the subframes, and a Physical Control Format Indicator Channel (PCFICH) value signaled in the subframes, and receives control information in at least one of the monitored enhanced control channel candidates.

Generally, an embodiment of the present invention encompasses a method in a UE for receiving control information. The method includes monitoring control channel candidates using common reference signals (CRS) and monitoring enhanced control channel candidates using demodulation reference signals (DMRS) when the UE is configured in a first transmission mode for receiving a downlink shared traffic channel based on DMRS, monitoring control channel candidates only using CRS when the UE is configured in a second transmission mode for receiving a downlink shared traffic channel based on CRS, and receiving downlink control information (DCI) in a subframe in one of the monitored control channel candidates or enhanced control channel candidates in the subframe.

Another embodiment of the present invention encompasses a method in a UE for receiving control information. The method includes receiving a subframe, determining if enhanced control channel candidates using DMRS are monitored in the subframe, monitoring, in the subframe, a set control channel candidates using CRS, and receiving, in the subframe, DCI in a control channel candidate within the set of control channel candidates, wherein the set control channel candidates is based on whether enhanced control channel candidates using DMRS are monitored in the subframe.

Yet another embodiment of the present invention encompasses a method in a UE for receiving control information. The method includes monitoring legacy control channel candidates using CRS, monitoring enhanced control channel candidates at a first set of aggregation levels in a first subframe, monitoring enhanced control channel candidates at a second set of aggregation levels in a second subframe, wherein the second set of aggregation levels is different from the first set of aggregation levels, determining the first set of aggregation levels and second set of aggregation levels based on one or more of a subframe type of the subframes, a channel state information (CSI) reference signal configuration in the subframes, and a Physical Control Format Indicator Channel (PCFICH) value signaled in the subframes, and receiving control information in at least one of the monitored enhanced control channel candidates.

In yet another embodiment of the present invention encompasses a method in a UE for receiving control information. The method includes monitoring a set of control channel candidates in a subframe, the set of control channel candidates comprising one or more control channel candidate types, the control channel candidate types including common reference signals (CRS)-based control channel candidate, and demodulation reference signals (DMRS)-based control channel candidate; determining a set of CRS-based control channel candidates in the monitored set of control channel candidates based on a number of control channel candidate types monitored; and receiving downlink control information (DCI) in a control channel candidate within the monitored set of control channel candidates including the determined set of CRS-based control channel candidates in the subframe.

Still another embodiment of the present invention encompasses a UE capable of receiving control information. The UE includes a wireless transceiver and a signal processing unit coupled to the transceiver, wherein the signal processing unit is configured to monitor control channel candidates using CRS and monitor enhanced control channel candidates using DMRSs when the UE is configured in a first transmission mode for receiving a downlink shared traffic channel based on DMRS, monitor control channel candidates only using CRSs when the UE is configured in a second transmission mode for receiving a downlink shared traffic channel based on CRSs, and receive DCI in a subframe in one of the monitored control channel candidates or enhanced control channel candidates in the subframe.

Yet another embodiment of the present invention encompasses a UE capable of receiving control information. The UE includes a wireless transceiver and a signal processing unit coupled to the transceiver, wherein the signal processing unit is configured to receive a subframe, determine if enhanced control channel candidates using DMRS are monitored in the subframe, monitor, in the subframe, a set control channel candidates using CRS, and receive, in the subframe, DCI in a control channel candidate within the set of control channel candidates, wherein the set control channel candidates is based on whether enhanced control channel candidates using DMRS are monitored in the subframe.

Still another embodiment of the present invention encompasses a UE capable of receiving control information. The UE includes a wireless transceiver and a signal processing unit coupled to the transceiver, wherein the signal processing unit is configured to monitor legacy control channel candidates using CRS, monitor enhanced control channel candidates at a first set of aggregation levels in a first subframe, monitor enhanced control channel candidates at a second set of aggregation levels in a second subframe, wherein the second set of aggregation levels is different from the first set of aggregation levels, determine the first set of aggregation levels and second set of aggregation levels based on one or more of a subframe type of the subframes, a CSI reference signal configuration in the subframes, and a PCFICH value signaled in the subframes, and receive control information in at least one of the monitored enhanced control channel candidates.

Figure 2:
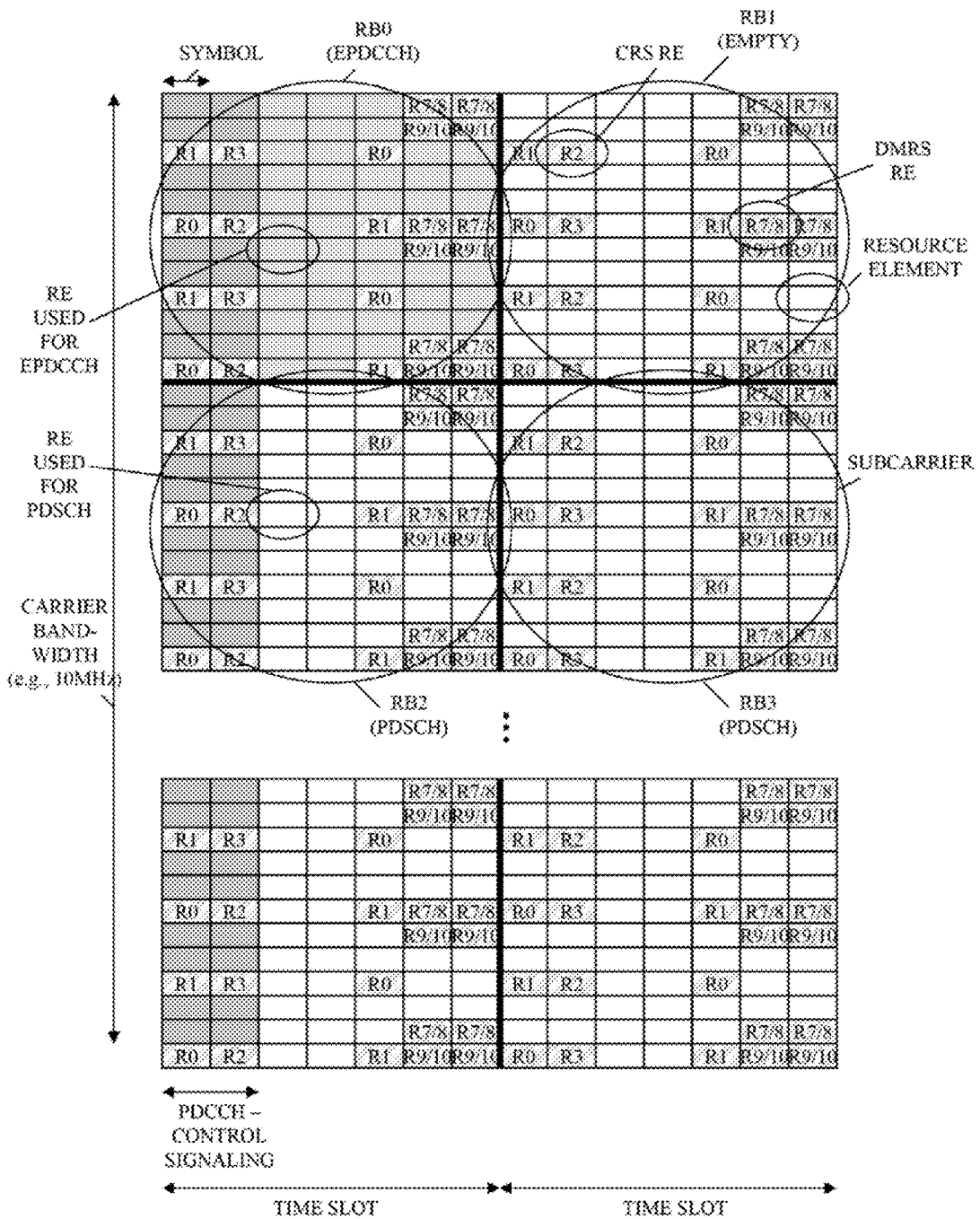
FIG. 2 is a time-frequency diagram of an exemplary OFDM subframe structure.
Figure 3:
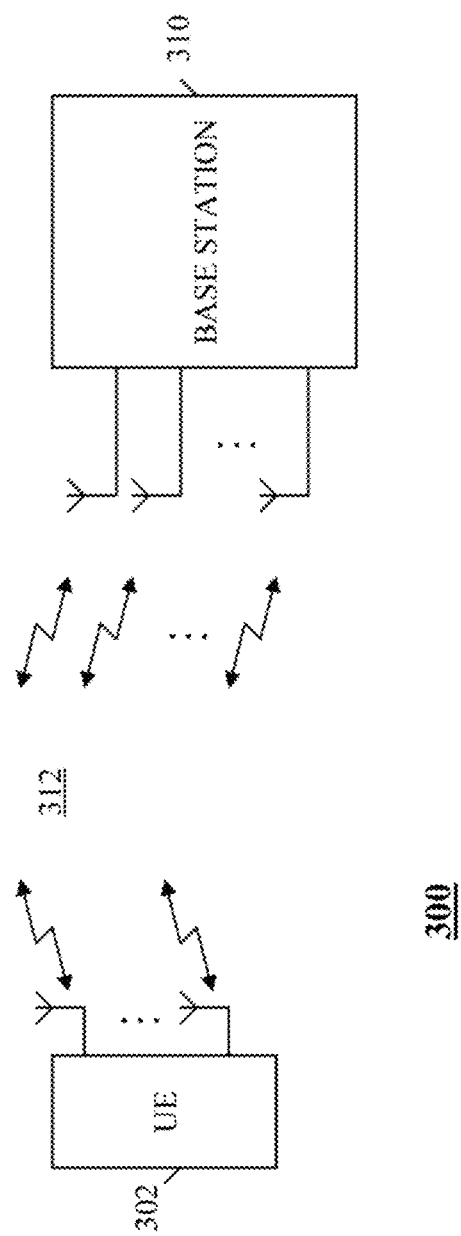
FIG. 3 is a block diagram of a wireless communication system in accordance with an embodiment of the present invention.

The present invention may be more fully described with reference to FIGS. 2-10. FIG. 2 depicts an exemplary subframe structure in which the UE expected to receive EPDCCH and PDSCH. As depicted in FIG. 2, the EPDCCH can be sent to the UE in Resource Block 0 (RB0) and the PDSCH can be sent to the UE in Resource Blocks 2 and 3 (RB2 and RB3). Resource Block 1 (RB1) is depicted as empty in FIG. 2, but RB1 can also be used to send the PDSCH or the EPDCCH to the UE. FIG. 3 is a block diagram of a wireless communication system 300 in accordance with an embodiment of the present invention. Communication system 300 includes a user equipment (UE) 302, such as but not limited to a cellular telephone, a radio telephone, or a personal digital assistant (PDA), personal computer, laptop computer, or computer tablet with radio frequency (RF) capabilities. Communication system 300 further includes an access network comprising a base station (BS) 310, such as a Node B, an eNodeB, an Access Point (AP), a Relay Node (RN), a Home Node B, a Home eNode B, Macro eNodeB (MeNB), Donor eNodeB (DeNB), femtocell, femto-node, pico-cell, network node or a Base Transceiver Station (BTS) (the terms BS, eNodeB, eNB, and NodeB are used interchangeably herein) or by other terminology used in the art, that includes an antenna array comprising multiple antennas and that supports Multiple-Input Multiple-Output (MIMO) communication, BS 310 provides communication services, via a corresponding air interface 312, to users' equipment, such as UE 102, residing in a coverage area, such as a cell or a sector of a cell, served by the BS. BS 310 can also each be referred to as a transmission point (TP) with a certain number of antennas. BS may comprise one or more transmitters and one or more receivers that serve the UEs. UEs may also comprise one or more transmitters and one or more receivers.

Air interface 312 comprises a downlink and an uplink. Each of the downlink and the uplink comprises multiple physical communication channels, including multiple control/signaling channels, such as a Physical Downlink Control Channel (PDCCH) and an Enhanced-PDCCH (EPDCCH) of the downlink, and multiple traffic channels, such as a downlink shared traffic channel, for example, a Physical Downlink Shared Channel (PDSCH).

Figure 5:
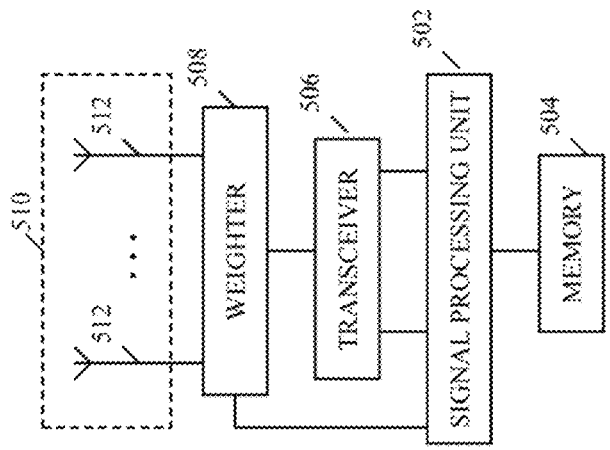
FIG. 5 is a block diagram of a base station of the communication system of FIG. 3 in accordance with an embodiment of the present invention.
Figure 4:
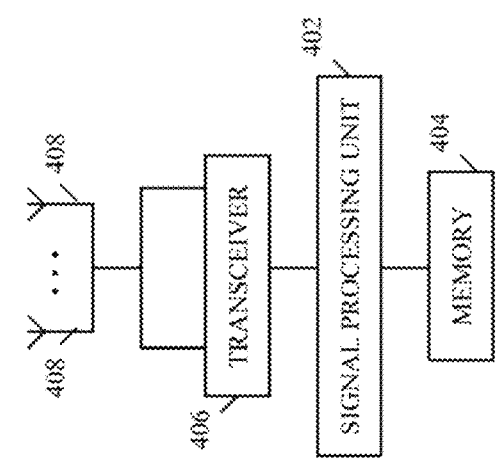
FIG. 4 is a block diagram of a user equipment of the communication system of FIG. 3 in accordance with an embodiment of the present invention.

Referring now to FIGS. 4 and 5, block diagrams are provided of UE 302 and BS 310 in accordance with various embodiments of the present invention. Each of UE 302 and BS 310 includes a respective signal processing unit 402, 502, such as one or more microsignal processing units, microcontrollers, digital signal processing units (DSPs), combinations thereof or such other devices known to those having ordinary skill in the art. The particular operations/functions of signal processing units 402 and 502, and respectively thus of UE 302 and BS 310, are determined by an execution of software instructions and routines that are stored in a respective at least one memory device 404, 504 associated with the signal processing unit, such as random access memory (RAM), dynamic random access memory (DRAM), and/or read only memory (ROM) or equivalents thereof, that store data and programs that may be executed by the corresponding signal processing unit.

Each of UE 302 and BS 310 further includes a respective one or more wireless transceivers 406, 506 that are coupled to the signal processing unit 402, 502 of the UE or BS and that exchange wireless signals between the UE and BS over air interface 312, such as the PDCCH, EPDCCH, and the PDSCH. UE 302 further includes multiple antennas 408 and supports MIMO communications. BS 310 further includes an antenna array 510 that comprises multiple antennas 512. By utilizing an antenna array to transmit signals to a UE located in a coverage area of the BS, such as a cell or sector serviced by the antenna array, the BS is able to utilize MIMO techniques for the transmission of the signals.

In a conventional sense, the term 'antenna port' typically has been used to refer to a 'physical' antenna port at BS 310. A reference signal is usually associated with (i.e., transmitted from) an antenna port, which allows a UE, such as UE 302, to make measurements on that antenna port, and thereby estimate a channel from the corresponding antenna port to the UE's receivers. In the 3GPP specifications, the definition of 'antenna port' has an expanded scope to deal with some new concepts. An antenna port is defined such that a channel over which a symbol on the antenna port is conveyed can be inferred from the channel over which another symbol on the same antenna port is conveyed. An antenna port could correspond to any well-defined description of a transmission from one or more of antennas. As an example, it could include a beamformed transmission from a set of antennas with antenna weights being applied, where the set of antennas itself could be unknown to the UE. In this case, the effective channel can be learned from a dedicated reference signal (DRS) sent from an associated antenna port. The dedicated reference signal may be beamformed similar to the beamformed data transmission with the same antenna weights being applied to the set of antennas. Typically, a reference signal is associated with an antenna port for the purpose of measurement or channel estimation or determination at the UE.

BS 310 further includes a weighter 508 in association with transceiver 506, such as a precoder or any other type of signal weighter, that is in communication with signal processing unit 502 and that is interposed between antenna array 510 and transceiver 506. In another embodiment of the present invention, weighter 508 may be implemented by signal processing unit 502. Weighter 508 weights signals applied to the multiple antennas 512 of antenna array 510 based on channel state information (CSI) fed back by a UE, such as UE 302, for example, codebook feedback such as a codebook index and a rank index, statistical feedback such as a covariance matrix or any other type of matrix, eigenvectors, or channel quality mean and variance, a received signal quality information, a channel frequency response, or any other type of channel feedback known in the art, in order to predistort and beamform the signals for transmission to the UE over the downlink of the intervening air interface.

When weighter 508 comprises a precoder, each of UE 302 and BS 310 may further maintain, in at least one memory devices 404 and 504 and/or in weighter 508, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail. Based on the channel conditions measured by a UE, the UE reports back a precoding metric, preferably a Precoding Matrix Indicator (PMI), for a group of resource elements (REs) where an RE is a time-frequency resource such as a 1 subcarrier in frequency by 1 OFDM symbol in time. In determining a precoding metric for a group of REs, the UE computes a set of complex weights based on the measured channel conditions. The set of complex weights can be Eigen Beamforming vectors derived from downlink reference signal measurements. The complex weights are mapped to a set of already defined vectors, that it, to a nearest vector of the set of already defined vectors, to produce a precoding vector. The UE then conveys the index of the precoding vector selected by the UE using an uplink control channel.

The embodiments of the present invention preferably are implemented within UE 302 and BS 310, and more particularly with or in software programs and instructions stored in the at least one memory devices 404, 504 and executed by signal processing units 402, 502 of the UE and BS. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 302 and BS 310. Based on the present disclosure, one skilled in the art will be readily capable of producing and implementing such software and/or hardware without undo experimentation.

Communication system 300 comprises an Orthogonal Frequency Division Multiple Access (OFDMA) modulation scheme for transmitting data over air interface 312, wherein a frequency channel, or bandwidth, is split into multiple physical resource blocks (PRBs) during a given time period. Each physical resource block (PRB) comprises multiple orthogonal frequency sub-carriers over a given number of OFDM symbols, that are the physical layer channels over which traffic and signaling channels are transmitted in a TDM or TDM/FDM fashion. A communication session may be assigned a PRB or a group of PRBs for an exchange of bearer information, thereby permitting multiple users to transmit simultaneously on the different PRBs such that each user's transmission is orthogonal to the other users' transmissions. A PRB also may be assigned to multiple users in which case the users are no longer orthogonal but they can be separated based on spatial signatures of the individual transmit weights.

In addition, communication system 300 preferably operates according to the Third Generation Partnership Project (3GPP) Long Term Evolution-Advanced (LTE-A) standards, which standards specify wireless telecommunications system operating protocols including radio system parameters and call processing procedures, and implements coordinated multipoint transmission (CoMP). As such, the PDCCH may be considered to be, and also is referred to herein, as a 'legacy control channel' as the PDCCH is a control channel utilized by earlier 3GPP communication systems, and the EPDCCH is an 'enhanced control channel,' and is also referred to herein as such, created by use in the latest proposed 3GPP LTE-A communication systems. However, those who are of ordinary skill in the art realize that communication system 100 may operate in accordance with any wireless telecommunication standard employing an Orthogonal Frequency Division Multiplexing (OFDM) modulation scheme, such as but not limited to other 3GPP communication systems employing channel estimation and received signal demodulation and channel quality feedback based on the channel estimation, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE 802.xx standards, for example, the 802.11a/HiperLAN2, 802.11g, or 802.20 standards, or a Worldwide Interoperability for Microwave Access (WiMAX) communication system that operates in accordance with the IEEE (Institute of Electrical and Electronics Engineers) 802.16 standards, including 802.16e and 802.16m.

Among the signals being multiplexed and transmitted to UE 302 from BS 310 are reference or pilot signals which may be multiplexed with other control information and user data. Reference signals, and more particularly Common Reference Signals (CRS) and UE specific reference Signals (UERS) or Demodulation reference Signals (DMRS) or Dedicated reference signals (DRS), are sent from antennas of a serving BS, that is, BS 310, to a served UE, that is, UE 302, in order for the UE to demodulate received user data and to determine channel state information (CSI) that is fed back to a serving BS. Additionally, with respect to CoMP transmissions, the UE may need to determine CSI for multiple transmission points or multiple BSs as well.

Figure 6:
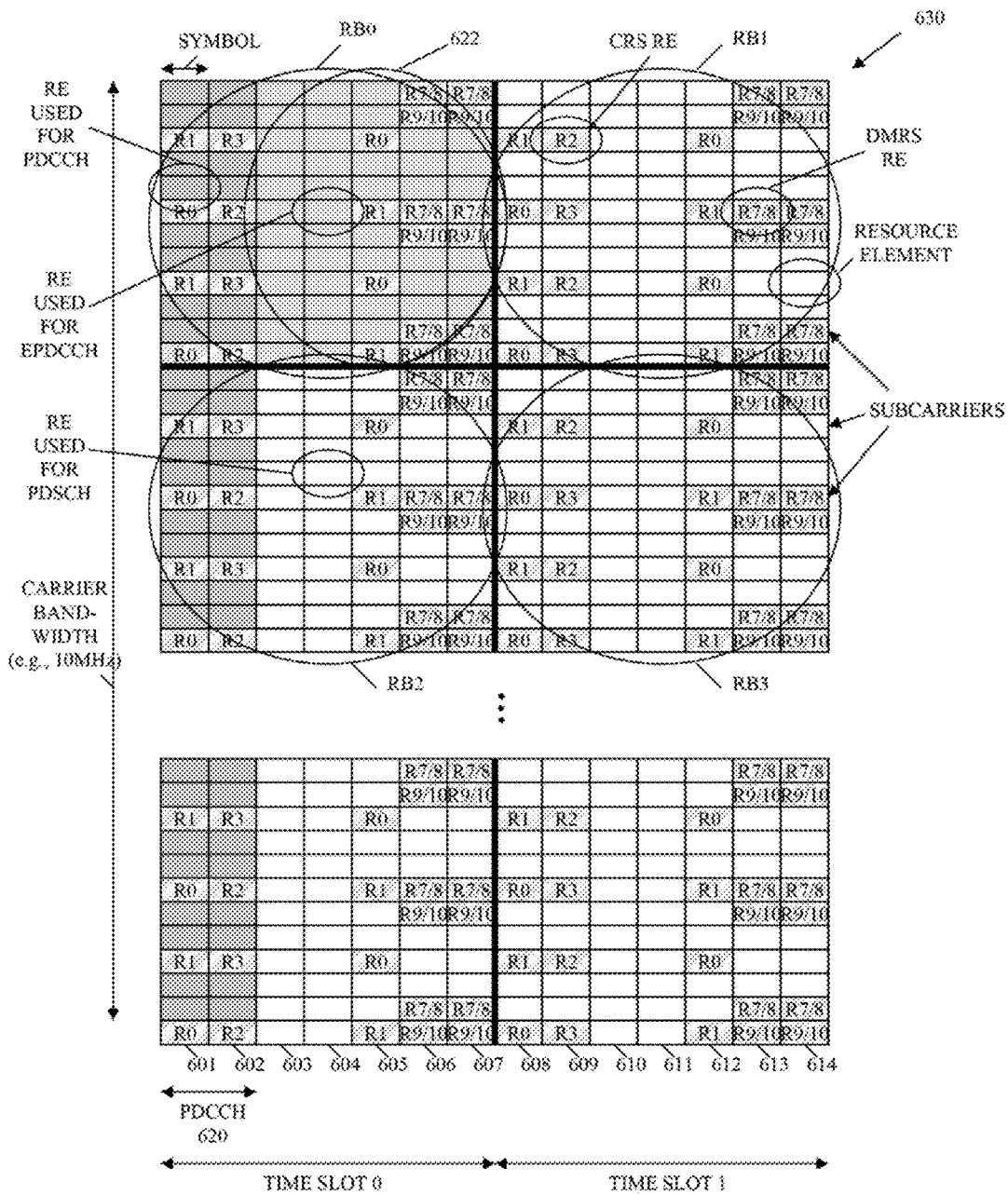
FIG. 6 is a time-frequency diagram of an exemplary OFDM subframe structure employed by the communication system of FIG. 3 and that illustrates reference signal placement within a subframe in accordance with an embodiment of the present invention.

Referring now to FIG. 6, a time-frequency diagram 600 is provided of an exemplary subframe structure that depicts exemplary distributions of reference signals, and particularly Common Reference Signals (CRS) and UE specific reference signals (UERS) or Demodulation reference signals (DMRS), in a OFDMA subframe 630 that may be employed by communication system 300 in accordance with various embodiments of the present invention. A vertical scale of time-frequency diagram 600 depicts multiple blocks of frequency, or frequency bins, (frequency subcarriers) of the subframe that may be allocated. A horizontal scale of time-frequency diagram 600 depicts multiple blocks of time (in units of OFDM symbols) 601-614 of the subframe that may be allocated. Subframe 630 comprises multiple resource blocks (RBs) such as Resource Block 0 (RB0), Resource Block 1 (RB1), Resource Block 2 (RB2), and Resource Block 3 (RB3), wherein each RB comprises 12 OFDM subcarriers over a time slot comprising seven (7) OFDM symbols. Typically, the subframe duration is 1 ms and it consists of two time slots of 0.5 ms duration each. In turn, each RB is divided into multiple resource elements (REs), wherein each RE is a single OFDM subcarrier, or frequency bin, on a single OFDM symbol.

For LTE Release 11, a UE such as UE 302 is expected to receive the EPDCCH in a set of RBs that may span only a portion of the carrier bandwidth in frequency domain. As depicted in subframe 630, UE 302 may expect to receive the EPDCCH and the PDSCH, wherein the EPDCCH is sent to the UE in RB0 and the PDSCH is sent to the UE in RB2 and RB3. RB1 is depicted as empty in FIG. 6, but RB1 can also be used to send the PDSCH or the EPDCCH to the UE.

In order to decode the information sent on the PDCCH, UE 302 needs to perform channel estimation after receiving the PDCCH. To perform channel estimation, the UE receives Reference Signals (RSs) that are included in the subframe. The RSs are associated with one or more antenna ports. For example, as depicted in FIG. 6, RSs labeled R0 are resource elements carrying reference signals associated with antenna port 0, RSs labeled R1 are resource elements carrying reference signals associated with antenna port 1, RSs labeled R2 are resource elements (REs) carrying reference signals associated with antenna port 2, and RSs labeled R3 are resource elements (REs) carrying reference signals associated with antenna port 3. The RSs associated with antenna ports 0, 1, 2, and 3 are typically referred to as "Common Reference Signals (CRS)." In order to demodulate user data (sent on PDSCH), 3GPP LTE Release 10 provides that a UE, such as UE 302, can either use the RSs associated with antenna ports 0, 1, 2, and 3 or can use RSs associated with other antenna ports, such as antenna ports 7, 8, 9, 10, 11, 12, 13, and 14, that is, the UE can use RSs associated with all or a subset of these antenna ports, based on the transmission scheme used for PDSCH reception (in turn, the transmission scheme depends on configuration signaling from the serving BS, that is, BS 310). The RSs associated with these other antenna ports 7, 8, 9, 10, 11, 12, 13, and 14 are typically referred to as "UE specific reference signals (UERS)" or "Demodulation reference signals (DMRS) or Dedicated reference signals (DRS)." Unlike the PDCCH, which is received by the UE using CRS, the EPDCCH is received by the UE using DMRS.

That is, as depicted in FIG. 6, REs labeled R0-R3 (and associated with antenna ports 0-3, respectively) are allocated to CRS (CRS REs) and REs labeled R7-R10 (and associated with antenna ports 7-10, respectively) are allocated to DMRS (DMRS REs). It should be understood that RSs corresponding to a group of antenna ports may be mapped into the set of available REs using any multiplexing method known in the art or a combination thereof, for example, either code division multiplexing (CDM) or frequency/time division multiplexing where each individual antenna reference signal occupies a different RE. For example, RSs corresponding to antenna ports 7 and 8 are multiplexed using CDM and are mapped to the same REs in time and frequency domain. Subframe 630 also includes other RSs that are distributed in the control regions and/or user data regions of the subframe. These other RSs may be present but are not necessarily used for demodulation of received signals by a UE in an LTE-A communication system. For example, the other RS may include the CSI-RS (Channel State Information reference signal) or muted RS where the UE shall assume and zero transmission power on the RS REs. that may be useful for interference measurements, or may include positioning RS that may be used for detecting location information, etc Further, as depicted in FIG. 6, RSs corresponding to an antenna port can be allocated to a resource element (RE) pair in user data regions, and more particularly to one of the RE pairs associated with OFDM symbols 606-607, and 613-614. For example, as depicted in FIG. 6, pairs of adjacent DMRS RE labeled as R7/8 may be allocated to antenna port 7 and antenna port 8 and, pairs of adjacent DMRS RE labeled as R9/10 may be allocated to antenna port 9 and antenna port 10. In this example, the RS for R7 and R8 are code-division multiplexed using orthogonal Walsh codes. Similarly, the RS for R9 and R10 are code-division multiplexed using orthogonal Walsh codes.

UE 302 is expected to monitor EPDCCH in a set of RBs (EPDCCH RB set) that may span only a portion of the carrier bandwidth in frequency domain Further the UE may monitor EPDDCH in only those time symbols in the subframe that are distinct from the time symbols corresponding to PDCCH. For example in FIG. 6, the UE can monitor PDCCH across the entire carrier bandwidth in frequency domain and in time symbols 601,602 in time domain (i.e., there are two control symbols in the example). It can monitor EPDCCH in one (e.g. RB0) or more RBs in frequency domain and symbols 603-607 or alternately, symbols 603-614 in time domain. For example, considering RB0 in FIG. 2, the UE monitors EPDCCH in that portion of RB0 622 that is not allocated for PDCCH. Alternately, RB0 may be defined to cover only the non-PDCCH control region resources i.e. excluding the resources assigned for PDCCH. In an alternate embodiment, RB0 may be defined to start from a pre-determined symbol and occupy the remaining symbols in the slot. The pre-determined symbol may be signaled to the UE via PDCCH or higher layer signaling (e.g., RRC or MAC signaling). To receive the EPDCCH, UE 302 has to monitor several EPDCCH candidates. Monitoring implies attempting to blindly decode one or more EPDCCH candidates (in this example blind decoding is attempted for each of the several EPDCCH candidates).

Figure 7:
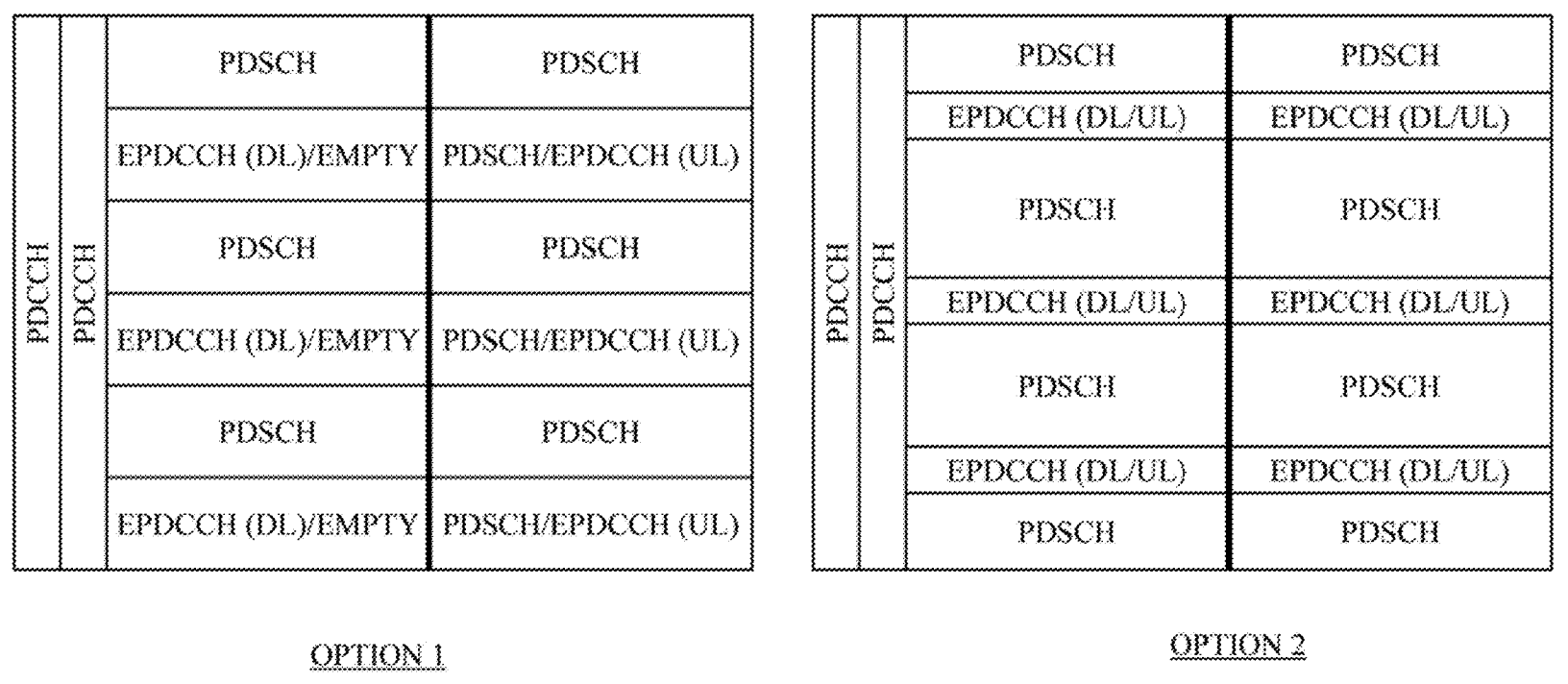

Referring now to FIG. 7, exemplary subframe structures that illustrate two approaches for signaling of the EPDCCH to a UE in accordance with various embodiments of the present invention are shown. In a first approach of the two approaches, that is, Option 1, DL assignments signaled to UE 302 are restricted to a first time slot (time slot 0), and uplink (UL) grants are restricted to a second time slot (time slot 1). In a second approach of the two approaches, that is, Option 2, both DL assignments and UL grants can be signaled to UE 302 in either the first time slot or the second time slot. In yet another option, DL assignments (or UL grants) can occupy both slots.

To receive EPDCCH using either approach depicted in FIG. 7, UE 302 first needs to know a set of RBs on which the new control signaling is expected, that is, an EPDCCH RB set. However, in order to reduce the blind decoding complexity at the UE, communication system 300 provides for an EPDCCH RB set that is smaller than the maximum number of RBs that the UE needs receive for a particular carrier bandwidth.

Figure 8:
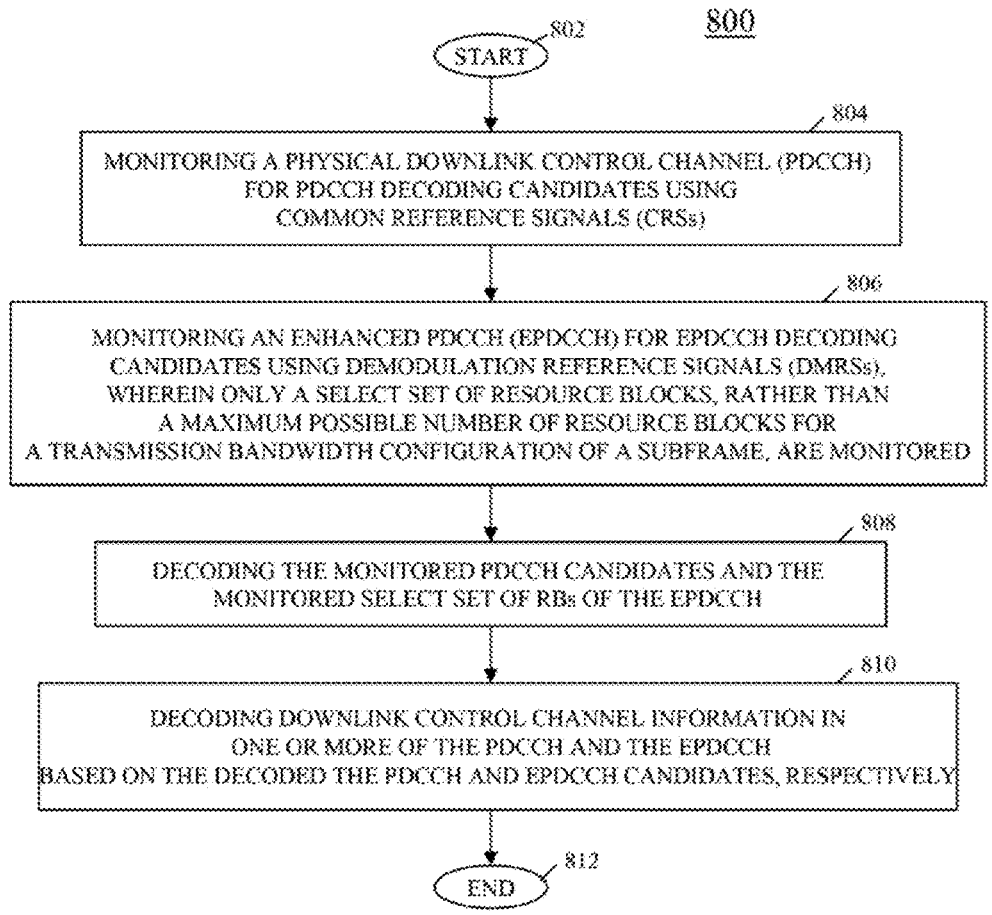
FIG. 8 is a logic flow diagram illustrating blind decoding performed by the user equipment of FIG. 3 in order to decode control information sent on one or more of a Physical Downlink Control Channel (PDCCH) and an Enhanced PDCCH (EPDCCH) in accordance with various embodiments of the present invention.

Referring now to FIG. 8, a logic flow diagram 800 is provided that illustrates blind decoding performed by UE 302 in order to decode control information sent on one or more of the PDCCH and the EPDCCH in accordance with various embodiments of the present invention. Logic flow 800 begins (802) when UE 302 monitors the downlink of air interface 312 for the PDCCH and the EPDCCH. In particular, UE 302 monitors (804) the PDCCH, for example, time symbols of PDCCH region 620 of subframe 630, for PDCCH decoding candidates using CRS. UE 302 also monitors (806) the EPDCCH, for example, EPDCCH region 622 of subframe 630, or more generally multiple RBs corresponding to EPDCCH in subframe 630 for EPDCCH decoding candidates using DMRS. In monitoring the EPDCCH, UE 302 monitors a select subset of the RBs, that is, UE 302 monitors an EPDCCH RB set that is smaller than the maximum number of RBs that the UE can receive in the subframe for a given transmission bandwidth configuration. In response to monitoring, and decoding (808), the PDCCH and EPDCCH candidates, UE 302 then receives and decodes (810) downlink control information (DCI) in one or more of the monitored PPDCCH and EPDCCH based on the decoded RBs of the PPDCCH and EPDCCH, respectively. Logic flow diagram 800 then ends (812).

Figure 10:
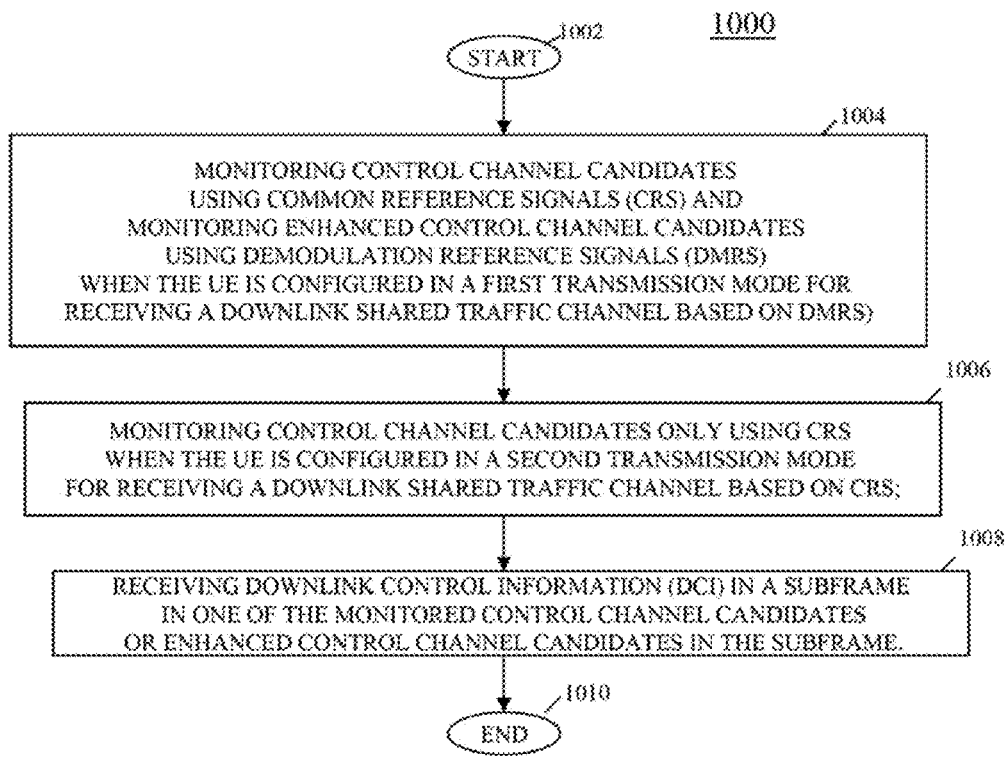
FIG. 10 is another logic flow diagram illustrating blind decoding performed by the user equipment of FIG. 3 in order to decode control information sent on one or more of a Physical Downlink Control Channel (PDCCH) and an Enhanced PDCCH (EPDCCH) in accordance with various embodiments of the present invention.

Referring now to FIG. 10, a logic flow diagram 1000 is provided that illustrates receiving downlink control information (DCI) by UE 302 in accordance with various embodiments of the present invention. Logic flow 1000 begins (1002) when UE 302 monitors the downlink of air interface 312 for control channel candidates. In particular, UE 302 monitors (1004) control channel candidates using common reference signals (CRS) and monitors enhanced control channel candidates using demodulation reference signals (DMRS) or UE-specific reference signals (UERS) when it is configured in a first transmission mode for receiving a downlink shared traffic channel based on DMRS. Monitoring control channel candidates using CRS can further comprise monitoring Physical Downlink Control Channel (PDCCH) candidates. Monitoring enhanced control channel candidates using DMRS can further comprise monitoring Enhanced Physical Downlink Control Channel (EPDCCH) candidates. The downlink shared traffic channel can be a Physical Downlink Shared Channel (PDSCH). The first transmission mode can be LTE transmission mode 9 or any other transmission mode where the UE receives PDSCH based on DMRS. The UE 302 monitors (1006) control channel candidates only using CRS when it is configured in a second transmission mode for receiving a downlink shared traffic channel based on CRS. The second transmission mode can be an LTE transmission mode 1, 2, 3, 4, 5 or any other transmission mode where the UE is expected to receive PDSCH using CRS but not DMRS. The UE 302 receives (1008) downlink control information (DCI) in a subframe (such as subframe 630) in one of the monitored control channel candidates or enhanced control channel candidates in the subframe. Logic flow diagram 1000 then ends (1010).

For example, for a 20 MHz carrier bandwidth, a UE, such as UE 302, typically is expected to receive a maximum of 100 RBs. Within those RBs, a smaller set (for example, a set of 10 RBs) can be specified for UE 302 to monitor for EPDCCH reception. In one such embodiment of the present invention, the EPDCCH RB set can be pre-specified for each carrier bandwidth. For example, for a 1.4 MHz carrier bandwidth, all 6 RBs in the carrier may form the EPDCCH RB set, and for a 20 MHz carrier bandwidth, RBs RB0, RB1, RB20, RB21, RB40, RB41, . . . , RB98, RB99 may form the EPDCCH RB set.

In another such embodiment of the present invention, multiple EPDCCH RB sets may be pre-specified for each carrier bandwidth and BS 310 may signal UE 302 which EPDCCH RB set to use in a particular subframe or a particular set of subframes. In still another such embodiment of the present invention, BS 310 may convey a bitmap to UE 302 that identifies the EPDCCH RB set for all subframes. In yet another such embodiment of the present invention, BS 310 may signal multiple EPDCCH RB sets to UE 302 and also signal which RB set to use in a particular subframe or in a particular set of subframes. RBs within the EPDCCH RB set can be selected to be either contiguous, that is, adjacent RBs, on non-contiguous in frequency domain. Contiguous RBs allow fore frequency selective transmission of EPDCCH, which is useful when BS 310 has accurate frequency selective Channel Quality Information (CQI) from UE 302, and non-contiguous RBs allow for frequency-distributed EPDCCH transmission. Further BS 310 may configure different UEs with different EPDCCH RB sets.

To receive the EPDCCH in a subframe, UE 302 is expected to monitor a set of EPDCCH candidates, that is, an EPDCCH candidate set, in the RBs comprising the EPDCCH RB set. Here, monitoring implies attempting to decode each of the candidates in the EPDCCH candidate set according to all applicable Downlink Control Information (DCI) formats for that candidate. Each EPDCCH candidate is associated with a control channel element (CCE) or a set of aggregated CCEs. As used herein, in the context of the EPDCCH, these can be called enhanced control channel elements (eCCEs) to distinguish them from the CCE terminology used for PDCCH.

Each enhanced control channel element (eCCE) comprises time-frequency resource elements (REs) within the RBs of the EPDCCH RB set.

In order to illustrate the principles of the present invention and not intending to limit the invention in any way, assume that the EPDCCH RB set of UE 302 contains RBs RB0, RB1, . . . , RBn (logical indexing is used here). The eCCEs then may be defined as described in any of the following examples.

In a first example, eCCE_0 comprises all the REs in RB0, eCCE_1 comprises all the REs in RB1, . . . , eCCE_n comprises all REs in RBn. In this example, the EPDCCH candidate set is equivalent to the EPDCCH RB set.

In a second example, eCCE_0 comprises a first subset of the REs in RB0, eCCE_1 comprises a second subset set of the REs in RB0, eCCE_2 comprises a first subset of the set of REs in RB1, eCCE_3 comprises a second subset set of REs in RB1, . . . , eCCE_2n−1 comprises a first subset of REs in RBn, and eCCE_2n comprises a second subset of REs in RBn.

In a third example and referring now to table 900 depicted in FIG. 9, an eCCE can be defined to comprise a minimum number of REs based on subframe type, for example, 36 REs for normal subframes and 40 REs for Multicast-Broadcast Single-Frequency Network (MBSFN) subframes for a Physical Control Format Indicator Channel (PCFICH) utilizing two PDCCH control symbols (that is, PCFICH=2) and two CRS ports. That is, table 900 depicts a number of available resource elements per resource block for the EPDCCH in accordance with various embodiments of the present invention. With respect to a first time slot, the second column of the table lists a number of PDCCH control symbols used. For example PCFICH=3, covers the case of 3 symbols used for PDCCH control. The third and fourth columns of the table list the range of possible eCCE sizes for a normal subframe and using two CRS ports (column 3) and using four CRS ports (column 4), where the smaller end of each range is due to use of channel state information reference signals (CSI RSs) and the larger end of each range is due to an absence of CSI RSs. The fifth and sixth fourth columns of the table list the range of possible eCCE sizes for an MBSFN subframe, again using two or four CRS ports and where the smaller end of each range is due to use of CSI RSs and the larger end of each range is due to an absence of CSI RSs. CSI RS can comprise both zero power CSI RS (or muted RS) or regular CSI RS.

Excess REs i.e., REs beyond the minimum CCE size, such as 12 REs (48-36) for normal subframes, PCFICH=1, 2CRS ports (minimum CCE size=36) and, 12 REs (52-40) for MBSFN subframes, PCFICH=1, two CRS ports (minimum CCE size=40) or 20 REs 56-36 for normal subframes, PCFICH=0, 2 CRS ports (minimum CCE size=36) and 20 REs (60-40) for MBSFN subframes, PCFICH=0, two CRS ports (minimum CCE size=40), may be either:
  i) considered as more DMRS REs (12/20), (channel estimation more complex),
  ii) considered as more eCCE REs (12/20), (more BDs if PCFICH not used and RRC configuration not used),
  iii) considered as more DMRS (8/8) and eCCE REs (4/12), (more balanced performance), or
  iv) considered as more DMRS for 1st (4/4) and 2nd (4/4) slot EPDCCH and more eCCE REs for 1st (0/8) and 2nd slot (4/4) EPDCCH.

UE 302 may then attempt to use the excess REs based on PCFICH detection or RRC configuration. To use the excess REs as eCCE REs, the UE can assume more eCCE REs correspond to subsequent soft circular buffer PDCCH DCI format contents.

In still other embodiments of the present invention, the set of EPDCCH candidates to be monitored by UE 302, that is, the EPDCCH candidate set, can also be defined in terms of search spaces. For example, an EPDCCH search space $S_k^{(L)}$ at aggregation level L refers to a set of EPDCCH candidates where each candidate in the search space is has L aggregated eCCEs. For PDCCH, aggregations of L=1, 2, 4, and 8 CCEs is supported. For EPDCCH, the same aggregation levels may be supported. However, in another embodiment of the present invention, since the size of eCCEs can be different from the fixed CCE size of 36 REs, other aggregation levels (e.g. L=3) may be used. Also, since the size of the eCCEs can change considerably between different subframes and slots within a subframe (for example, based on PCFICH value, presence of CSI-RS, based on subframe type), a set of aggregation levels that the UE assumes for EPDCCH monitoring also may vary between subframes or between slots in a same subframe or between different subframe types (for example, a normal subframe vs. an MBSFN subframe). More generally, a set of aggregation levels that the UE assumes for EPDCCH monitoring can vary between a first time period and a second time period.

The number of available REs for EPDCCH in an RB, that is, REs not mapped to PDCCH or CRS or DMRS, is shown in table 900 depicted in FIG. 9. Normal cyclic prefix (CP) subframe structure is assumed for table 900. Each cell of table 900 shows two values, a1-a2, where 'a1' is the number of available REs if EPDCCH is mapped around all possible zero power and regular CSI-RS in a time slot; and 'a2' is the number of available REs if there is no CSI-RS in a time slot. Depending on CSI-RS configuration the number of available REs for EPDCCH in an RB can take any between a1 and a2 including a1 and a2.

For example, consider a design where each eCCE corresponds to all the available REs in an RB and a case of 'Normal subframe—2CRS ports—PCFICH=3' in table 900. For subframes where CSI-RS is not configured, UE 302 may monitor search spaces with aggregation levels 1, 2, 4, and 8 (that is, 32, 64, 128, and 256 REs) in the first time slot and only monitor search spaces with aggregation levels 1, 2, and 4 (that is, 64, 128, and 256 REs) in the second time slot. In subframes where full CSI-RS is configured, the UE can monitor search spaces with aggregation levels 2, 4, and 8 (that is, 48, 96, and 192 REs) in the first time slot (since 24 REs which corresponds to aggregation level 1 might be too small to fit DCI) and aggregation levels 1, 2, 4, and 8 (32, 64, 128, and 256 REs) in the second time slot.

For PDCCH, only a Quadrature Phase Shift Keying (QPSK) modulation scheme is used for transmitting DCI. For EPDCCH, since the eCCEs are transmitted in different RBs, it may be possible to use a higher order modulation scheme for some EPDCCH candidates. Therefore, in addition to an aggregation level, search spaces and search space candidates for EPDCCH can also be defined based on the modulation used for EPDCCH transmission. For example, the UE may monitor an EPDCCH candidate with 1eCCE aggregation level and QPSK modulation and another EPDCCH candidate with 1eCCE aggregation level and 16QAM (Quadrature Amplitude Modulation) modulation. Also, all the EPDCCH candidates monitored at the QPSK modulation level can comprise a search space at the QPSK modulation level and all EPDCCH candidates monitored at the 16QAM modulation level can comprise a search space at the 16QAM modulation level.

As described above, PDCCH transmissions to the UE are based on CRS, while EPDCCH transmissions to the UE may be based on DMRS. EPDCCH transmission using DMRS allows spatial multiplexing of DCI of two separate UEs onto a same set of time-frequency resources, that is, a same eCCE. Such a transmission scheme is typically referred to as multi-user (MU) MIMO. To support MU-MIMO, BS 310 has to use separate precoding weights for EPDCCH transmission to each UE and each such UE has to determine the precoding weight used for its EPDCCH from the DMRS associated with the EPDCCH transmission. Therefore, with MU-MIMO, multiple EPDCCHs (each associated with a particular DMRS antenna port), can be transmitted on a single eCCE. From a UE perspective, when MU-MIMO is used for EPDCCH transmission, multiple EPDCCH candidates, each candidate being associated with a DMRS antenna port, can be monitored by a UE on an eCCE or on a set of aggregated eCCEs. Given this, in addition to aggregation level and modulation order, search spaces and search space candidates for EPDCCH can also be defined based on the DMRS antenna port associated with EPDCCH transmission. For example, a UE, that is, UE 302, may monitor an EPDCCH candidate with 1eCCE aggregation level, QPSK modulation and DMRS antenna port 7 based transmission. The UE may also monitor another EPDCCH candidate with 1eCCE aggregation level, QPSK modulation and DMRS antenna port 8 based transmission. Also, all the EPDCCH candidates monitored based on DMRS port 7 based transmissions can comprise a search space associated with DMRS port 7. Similarly, all the EPDCCH candidates monitored based on DMRS port 8 based transmissions can comprise a search space associated with DMRS port 8.

The EPDCCH candidates that UE 302 monitors can be further divided into a set of common search space candidates (or enhanced common search space (eCSS) to differentiate with the CSS for PDCCH), and a set of UE specific search space candidates (or enhanced UE specific search space (eUESS) to differentiate with the UESS for PDCCH). eCSS candidates may be monitored on a EPDCCH RB set that is broadcast to all the UEs in the coverage area of the serving BS, that is, BS 310. For example, in LTE, this information can be broadcasted in a Master Information block (MIB) or in a System Information Block (SIB). The eUESS candidates may be monitored on a EPDCCH RB set that is signaled to the UE via UE specific RRC signaling.

In LTE, in order to receive the PDCCH, a UE, such as UE 302, monitors a set of PDCCH candidates. More specifically, the UE, that is, UE 302, monitors one common search space (CSS) at each of the CCE aggregation levels 4 and 8 (4 PDCCH candidates at aggregation level 4, and 2 PDCCH candidates at aggregation level 8). The DCI formats associated with PDCCH candidates in the CSS have two different sizes. Therefore, UE 302 has to perform two blind decodes for each PDCCH candidate in the CSS. UE 302 also monitors one UE-specific search space at each of the CCE aggregation levels 1, 2, 4, and 8 (6 candidates at aggregation level 1, 6 candidates at aggregation level 2, 2 candidates at aggregation level 4, 2 candidates at aggregation level 8). The DCI formats associated with PDCCH candidates in the UESS have two different sizes if the UE is not configured for uplink MIMO and three different sizes if the UE is configured for uplink MIMO. Therefore, the UE has to perform either two or three blind decodes for each PDCCH candidate in the UESS. In summary, in order to monitor PDCCH candidates in CSS, the UE has to perform a maximum of '(4+2)*2=12' blind decodes (BDs), and to monitor PDCCH candidates in UESS, the UE has to perform a maximum of either '(6+6+2+2)*2=32' BDs or '(6+6+2+2)*3=48' BDs. Combining this, the UE has to be capable to perform a maximum of '12+32=44' BDs without UL-MIMO and '12+48=60' BDs with UL MIMO. If the UE is configured for carrier aggregation (CA), the UE monitors an additional UESS at aggregation level 1, 2, 4, 8 for each configured and activated secondary cell and it has to be capable to perform the additional blind decodes required for monitoring these additional search spaces.

In LTE, in order to receive the PDSCH, a UE, such as UE 302, is configured with a transmission mode from among multiple known LTE transmission modes. For example, if the UE, that is, UE 302, is configured in transmission mode 2, the UE can receive the PDSCH using CRS and the transmit diversity transmission scheme. If UE 302 is configured with transmission modes 3, 4, 5, or 6, the UE can receive PDSCH using CRS and MIMO based transmission schemes such as open loop spatial multiplexing, closed loop spatial multiplexing and MU-MIMO. If UE 302 is configured with transmission modes 7 or 8, the UE can receive PDSCH using UE-specific RSs. If UE 302 is configured in transmission mode 9, the UE can receive PDSCH using DMRS and spatial multiplexing of up to eight layers is possible. Transmission mode 9 is suitable for PDSCH reception using advanced features such as CoMP and further enhanced MIMO techniques including MU-MIMO. Configuring the UE in transmission mode 9 also allows for beamformed frequency-selective transmission of PDSCH to the UE. During initial access to the network, that is, before receiving transmission mode configuration signaling from BS 310, UE 302 can receive PDSCH using either transmission mode 1 or transmission mode 2, which are the default transmission modes of LTE.

Since advanced transmission schemes such as multi-layer frequency selective beamforming using DMRS can only be supported by UE 302 when the UE is configured in transmission mode 9, the UE may monitor EPDCCH candidates only when it is configured for transmission mode 9. More generally, since EPDCCH is used for improving control channel performance for certain specific enhanced transmission modes for receiving PDSCH, UE 302 may monitor EPDCCH candidates only when it is configured in those enhanced transmission modes for receiving PDSCH. When UE 302 is configured in the legacy transmission modes, the UE only needs to monitor the PDCCH candidates and the UE may skip monitoring the set of EPDCCH candidates. For example, during initial access or, for subframes where UE 302 is configured in one of transmission modes 1-8, the UE may monitor PDCCH candidates only. For subframes where UE 302 is configured in transmission mode 9, the UE then may monitor EPDCCH candidates.

Alternately, the base station can send a trigger to the UE to monitor both PDCCH and EPDCCH candidates. With this alternative, the UE, based on receiving the trigger, determines whether it should monitor PDCCH candidates only (using CRS) or, monitor both PDCCH (using CRS) and EPDCCH (using DMRS) candidates. The trigger can be signaled to the UE using RRC signaling or Medium Access Control (MAC) layer signaling or via a bit (or sequence of bits) in PDCCH. In another alternative, the UE may be configured by the base station to monitor both PDCCH and EPDCCH candidates in a first subset of subframes within a frame and, to monitor only PDCCH candidates in a second subset of subframes within the frame. A frame may be a radio frame that typically comprises multiple subframes. For example, 1 frame=10 subframes. In yet another alternative, the UE may be configured by the base station to monitor only EPDCCH candidates in a first subset of subframes within a frame and to monitor only PDCCH candidates in a second subset of subframes within the frame.

In LTE Releases 8, 9, and 10, a UE, such as UE 302, has to support a maximum of 60 blind decoding operations for a serving cell, and all the blind decoding operations are performed to monitor PDCCH. For LTE Release 11, when the UE, that is, UE 302, monitors EPDCCH, the number of blind decodes the UE performs should be shared between PDCCH and EPDCCH monitoring so that overall blind decoding complexity at the UE is either not increased compared LTE Rel10 or is kept at level comparable to that of LTE Rel10.

For example, when UE 302 is not configured in transmission mode 9, all blind decodes performed by the UE in a subframe may be used for monitoring PDCCH. When UE 302 is configured in transmission mode 9, the UE monitors PDCCH (i.e., PDCCH control channel candidates) for a first set of DCI formats and monitors EPDCCH candidate set for a different set of DCI formats, thereby splitting the blind decoding operations between the PDCCH and the EPDCCH. Alternately, UE 302 may monitor PDCCH search spaces at a first set of aggregation levels (for example, aggregation levels 1, 2, 4, and 8) and the may monitor EPDCCH search spaces at a different set of aggregation levels (for example, only aggregation levels 2 and 4). Further, at each aggregation level, the UE may monitor a different number of candidates for PDCCH and EPDCCH.

In another example, in a subframe where UE 302 monitors the EPDCCH, the UE only monitors PDCCH candidates belonging to the CSS. In this example, UE 302 has to perform 12 blind decodes for PDCCH and all the other blind decodes, that is, 48 blind decodes assuming a maximum number of blind decodes in a subframe is 60, can be used for monitoring the EPDCCH. In still another example, UE 302 may monitor PDCCH candidates for DCI formats signaling downlink assignments and the UE may monitor EPDCCH candidates for DCI formats signaling uplink assignments.

Some examples based on combinations of the implicit blind decode partitioning methods of the present invention discussed above are as follows. In a first example, UE 302 may monitor the PDCCH for DCI formats 0/1A and 1C (6 candidates in CSS and 16 candidates in UESS) and monitor the EPDCCH for DCI formats 0/1A and 2C (16 EPDCCH candidates). This results in '(4+2)*2+(6+6+2+2)*1=28' blind decodes for the PDCCH and '(6+6+2+2)*2=32' blind decodes for the EPDCCH, or a total of '28+32=60' blind decodes.

In a second example, UE 302 may monitor the PDCCH for DCI formats 0/1A and 1C and at only aggregation levels 2, 4, and 8 in UESS (6 candidates in CSS and 10 candidates in UESS) and monitor the EPDCCH for DCI formats 0/1A, 2C and optionally 4 at only aggregation levels 1 and 2 (12 EPDCCH candidates). This results in '(4+2)*2+(0+6+2+2)*1=22' blind decodes for the PDCCH and '(6+6+0+0)*3=36' blind decodes for the EPDCCH, resulting in a total of '22+36=58' blind decodes.

More generally, the UE can monitor a set of control channel candidates in a subframe and the set of control channel candidates can comprise control channel candidates of one or more control channel candidate types. The UE can then determine a set of control channel candidates of a first type in the monitored set of control channel candidates based on the number of control channel candidate types monitored in the subframe. For example, one control channel candidate type can be a common reference signals (CRS)-based control channel candidate type. Another control channel candidate type can be a demodulation reference signals (DMRS)-based control channel candidate type. The UE can then determine the set of CRS based control channel candidates to monitor in the subframe based on whether one type of control channel candidates (e.g. only CRS based control channel candidates) are monitored in the subframe or whether two types of control channel candidates (e.g. both CRS and DMRS based control channel candidates) are monitored in the subframe. Finally, the UE can receive downlink control information (DCI) in a control channel candidate within the monitored set of channel candidates (including the determined set of CRS-based control channel candidates) in the subframe. In one embodiment, the UE can determine the number of control channel candidate types to monitor in the subframe based on a PDSCH transmission mode configured for the UE. For example, if the UE is configured in a PDSCH transmission mode where the UE can receive PDSCH using DMRS, the UE can monitor two types of control channel candidates (e.g. both CRS and DMRS based control channel candidates) in the subframe. Otherwise, if the UE is configured in a PDSCH transmission mode where the UE can receive PDSCH using CRS, but not DMRS, the UE can monitor only one type of control channel candidates (e.g. only CRS based control channel candidates). In the above examples, monitoring a control channel candidate implies attempting to decode a control channel candidate. Monitoring a CRS based control channel candidate type implies attempting to decode a control channel candidate using CRS for channel estimation purposes. Monitoring a DMRS based control channel candidate type implies attempting to decode a control channel candidate using DMRS for channel estimation purposes.

While monitoring (i.e., attempting to decode) control channel candidates, if the UE successfully decodes a control channel candidate (either a PDCCH control channel candidate or an EPDCCH control channel candidate), it can then receive the DCI transmitted in that control channel candidate. In order to determine whether a control channel candidate is successfully decoded, the UE can compare a set of cyclic redundancy check (CRC) mask bits associated with the DCI transmitted in the control channel candidate with the UE's unique identifier (UEID). If the CRC mask bits match the UEID, the UE can determine that the decoding of the control channel candidate is successful and receive the DCI transmitted in the control channel candidate.

In still other examples, BS 310 can signal (via higher layers) the set of DCI formats for which UE 302 monitors PDCCH and the set of DCI formats for which the UE monitors EPDCCH. BS 310 also can signal the set of aggregation levels and DMRS antenna ports that UE 302 can use to monitor EPDCCH. Alternately, BS 310 can signal the number of BDs the UE 302 has to perform for PDCCH and EPDCCH monitoring and the UE can infer the set of PDCCH and EPDCCH candidates from this signaling.

By providing for a UE, such as UEs 301 and 302, to monitor control channel candidates using common reference signals (CRS) and monitor enhanced control channel candidates using demodulation reference signals (DMRS) when the UE is configured in a first transmission mode for receiving a downlink shared traffic channel based on DMRS, and to monitor control channel candidates only using CRS when the UE is configured in a second transmission mode for receiving a downlink shared traffic channel based on CRS, communication system 100 provides for reduced blind decoding complexity at the UE. The DCI formats for which the PDCCH candidates are monitored and the aggregation levels at which the PDCCH candidates are monitored can change based on whether the UE is monitoring only the PDCCH or both the PDCCH and the EPDCCH in the subframe.

In other embodiments of the present invention, the UE may determine if enhanced control channel candidates using demodulation reference signals (DMRS) are monitored in a subframe, monitor, in the subframe, a set control channel candidates using common reference signals (CRS), and receive, in the subframe, downlink control information (DCI) in a control channel candidate within the set of control channel candidates, wherein the set control channel candidates is based on whether enhanced control channel candidates using demodulation reference signals (DMRS) are monitored in the subframe. In still other embodiments of the present invention, the UE monitor legacy control channel candidates using common reference signals (CRS), monitor enhanced control channel candidates at a first set of aggregation levels in a first subframe, monitor enhanced control channel candidates at a second set of aggregation levels in a second subframe, wherein the second set of aggregation levels is different from the first set of aggregation levels, determine the first set of aggregation levels and second set of aggregation levels based on one or more of a subframe type of the subframes, a channel state information (CSI) reference signal configuration in the subframes, and a Physical Control Format Indicator Channel (PCFICH) value signaled in the subframes, and receive control information in at least one of the monitored enhanced control channel candidates.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a user equipment (UE) for receiving control information, the method comprising: monitoring control channel candidates using common reference signals (CRS) and monitoring enhanced control channel candidates using demodulation reference signals (DMRS) when the UE is configured in a first transmission mode for receiving a downlink shared traffic channel based on DMRS; monitoring control channel candidates only using CRS when the UE is configured in a second transmission mode for receiving a downlink shared traffic channel based on CRS; and receiving downlink control information (DCI) in a subframe in one of the monitored control channel candidates or enhanced control channel candidates in the subframe, wherein monitoring control channel candidates using CRS further comprises monitoring Physical Downlink Control Channel (PDCCH) candidates, wherein monitoring enhanced control channel candidates using DMRS further comprises monitoring Enhanced Physical Downlink Control Channel (EPDCCH) candidates, and wherein the downlink shared traffic channel is a Physical Downlink Shared Channel (PDSCH), and wherein monitoring the EPDCCH candidates comprises: monitoring a set of EPDCCH candidates in the subframe; monitoring a first subset of the set of EPDCCH candidates at a first set of aggregation levels in a first slot of the subframe; and monitoring a second subset of the set of EPDCCH candidates at a second set of aggregation levels in a second slot of the subframe, wherein the second set of aggregation levels is different from the first set of aggregation levels.

2. The method of claim 1, wherein the first transmission mode is transmission mode 9.

3. The method of claim 1, wherein the second transmission mode is one of transmission modes 1, 2, 3, 4, 5, and 6.

4. The method of claim 1, wherein the PDCCH candidates are monitored in a first set of time symbols in the subframe and the EPDCCH candidates are monitored in a second set of time symbols in the subframe, wherein the first and second set of time symbols are distinct.

5. The method of claim 1, wherein monitoring the PDCCH candidates comprises: monitoring a set of PDCCH candidates in the subframe; wherein the set of PDCCH candidates is determined based on whether both PDCCH candidates and EPDCCH candidates are monitored in the subframe or, only PDCCH candidates are monitored in the subframe.

6. The method of claim 1, wherein monitoring the PDCCH candidates comprises: monitoring a first number of PDCCH candidates in the subframe when both PDCCH candidates and EPDCCH candidates are monitored in the subframe; monitoring a second number of PDCCH candidates in the subframe when only PDCCH candidates are monitored in the subframe; wherein the first number is smaller than the second number.

7. The method of claim 1, wherein monitoring the EPDCCH candidates comprises: monitoring a set of EPDCCH candidates in the subframe using a set of aggregation levels; wherein the set of aggregation levels is determined based on one or more of a subframe type of the subframe, a channel state information (CSI) reference signal configuration, a Physical Control Format Indicator Channel (PCFICH) value signaled in the subframes.

8. The method of claim 7, wherein the subframe type comprises one of a normal subframe type and a Multicast-Broadcast Single-Frequency Network (MBSFN) subframe type.

9. A user equipment capable of receiving control information, the user equipment comprising: a wireless transceiver; and a signal processing unit coupled to the transceiver and that is configured to monitor control channel candidates using common reference signals (CRS) and monitor enhanced control channel candidates using demodulation reference signals (DMRS) when the UE is configured in a first transmission mode for receiving a downlink shared traffic channel based on DMRS, monitor control channel candidates only using CRS when the UE is configured in a second transmission mode for receiving a downlink shared traffic channel based on CRS, and receive downlink control information (DCI) in a subframe in one of the monitored control channel candidates or enhanced control channel candidates in the subframe, wherein the signal processing unit is configured to monitor control channel candidates using CRS by monitoring Physical Downlink Control Channel (PDCCH) candidates, wherein monitoring enhanced control channel candidates using DMRS further comprises monitoring Enhanced Physical Downlink Control Channel (EPDCCH) candidates, and wherein the downlink shared traffic channel is a Physical Downlink Shared Channel (PDSCH), and wherein the signal processing unit is configured to monitor the EPDCCH candidates by monitoring a set of EPDCCH candidates in the subframe, monitoring a first subset of the set of EPDCCH candidates at a first set of aggregation levels in a first slot of the subframe, and monitoring a second subset of the set of EPDCCH candidates at a second set of aggregation levels in a second slot of the subframe, wherein the second set of aggregation levels is different from the first set of aggregation levels.

10. The user equipment of claim 9, wherein the first transmission mode is transmission mode 9.

11. The user equipment of claim 9, wherein the second transmission mode is one of transmission modes 1, 2, 3, 4, 5, and 6.

12. The user equipment of claim 9, wherein the PDCCH candidates are monitored in a first set of time symbols in the subframe and the EPDCCH candidates are monitored in a second set of time symbols in the subframe, wherein the first and second set of time symbols are distinct.

13. The user equipment of claim 9, wherein the signal processing unit is configured to monitor the PDCCH candidates by monitoring a set of PDCCH candidates in the subframe, wherein the set of PDCCH candidates is determined based on whether both PDCCH candidates and EPDCCH candidates are monitored in the subframe or, only PDCCH candidates are monitored in the subframe.

14. The user equipment of claim 9, wherein the signal processing unit is configured to monitor the PDCCH candidates by monitoring a first number of PDCCH candidates in the subframe when both PDCCH candidates and EPDCCH candidates are monitored in the subframe and monitoring a second number of PDCCH candidates in the subframe when only PDCCH candidates are monitored in the subframe, wherein the first number is smaller than the second number.

15. The user equipment of claim 9, wherein the signal processing unit is configured to monitor the EPDCCH candidates by monitoring a set of EPDCCH candidates in the subframe using a set of aggregation levels, wherein the set of aggregation levels is determined based on one or more of a subframe type of the subframe, a channel state information (CSI) reference signal configuration, a Physical Control Format Indicator Channel (PCFICH) value signaled in the subframes.

16. The user equipment of claim 15, wherein the subframe type comprises one of a normal subframe type and a Multicast-Broadcast Single-Frequency Network (MBSFN) subframe type.

* * * * *